US010870381B2

(12) United States Patent
Kondrad et al.

(10) Patent No.: US 10,870,381 B2
(45) Date of Patent: Dec. 22, 2020

(54) LOCK ASSEMBLY

(71) Applicant: Ford Global Technologies, LLC, Dearborn, MI (US)

(72) Inventors: Marcos Silva Kondrad, Macomb Township, MI (US); Rodney Charles Brinker, Eastpointe, MI (US); Corbin Shea Johnston, Winnipeg (CA); Spencer Robert Hoernke, Dundas (CA); Johnathan Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/566,157

(22) Filed: Sep. 10, 2019

(65) Prior Publication Data

US 2020/0001765 A1 Jan. 2, 2020

Related U.S. Application Data

(63) Continuation of application No. 15/815,166, filed on Nov. 16, 2017, now Pat. No. 10,464,460.

(51) Int. Cl.
*B60N 3/00* (2006.01)
*A47B 3/08* (2006.01)
(Continued)

(52) U.S. Cl.
CPC ............ *B60N 3/004* (2013.01); *A47B 3/0818* (2013.01); *B60N 2/32* (2013.01); *B60N 2/90* (2018.02)

(58) Field of Classification Search
CPC .. B64D 11/0638; B64D 11/0605; B27N 5/00; B29K 2101/12; B29L 2031/448; B60N 3/001; B60N 3/002; Y10T 292/096; Y10T 292/0968; Y10T 292/0976; Y10T 292/0997; Y10T 292/1022; Y10T 292/102; Y10T 292/0964; Y10S 292/37; A47B 13/081
USPC ......... 108/44, 161, 42, 137, 143; 296/37.16, 296/24.34, 37.15, 190.1, 65.05, 69, 24.39; 248/27.1, 311.2, 429, 430; 297/145, 173, 297/135; 244/118.5, 118.3, 122 R
See application file for complete search history.

(56) References Cited

U.S. PATENT DOCUMENTS 5,052,461 A * 10/1991 Stern .................. E06B 9/04
160/224
5,460,105 A * 10/1995 Given, Jr. ............. A47B 11/00
108/137
(Continued)

FOREIGN PATENT DOCUMENTS

EP 3381807 * 10/2018
FR 2915960 * 11/2008

*Primary Examiner* — Janet M Wilkens
(74) *Attorney, Agent, or Firm* — David Coppiellie; Price Heneveld LLP

(57) ABSTRACT

A work surface is provided with a lock assembly. The lock assembly includes an actuator plate and a locking plate. The actuator plate includes a pin. The locking plate includes an angled slot that receives the pin of the actuator plate. Actuation of the actuator plate in a first direction causes the pin to move within the angled slot of the locking plate. The movement of the pin within the angled slot causes movement of the locking plate in a second direction, thereby actuating the locking plate between a locked configuration and an unlocked configuration.

20 Claims, 11 Drawing Sheets

(51) Int. Cl.
*B60N 2/32* (2006.01)
*B60N 2/90* (2018.01)

(56) References Cited

U.S. PATENT DOCUMENTS

| | | | |
|---|---|---|---|
| 6,347,590 B1 | 2/2002 | D'Annunzio et al. | |
| 7,143,701 B2 | 12/2006 | Lindstrom et al. | |
| 7,303,226 B2 * | 12/2007 | Bernstein | B60N 2/14 296/190.01 |
| 7,341,233 B2 * | 3/2008 | McMains | A47C 1/023 248/424 |
| 7,520,552 B2 * | 4/2009 | Nakamura | B60R 7/04 108/44 |
| 7,562,931 B2 * | 7/2009 | Stojanovic | B60N 2/3013 296/24.4 |
| 7,597,292 B2 * | 10/2009 | Kayumi | B60N 2/0705 248/157 |
| 7,627,985 B2 * | 12/2009 | Marsden | E05B 65/0014 49/394 |
| 7,874,614 B2 * | 1/2011 | Figueras Mitjans | A47C 7/70 297/145 |
| 8,083,272 B1 * | 12/2011 | Wu | H01L 21/67373 292/156 |
| 9,758,064 B1 * | 9/2017 | Dry | B60N 3/002 |
| 10,023,315 B2 * | 7/2018 | Kuyper | B64D 11/06 |
| 2005/0235295 A1 * | 10/2005 | Hsu | G11B 33/022 720/600 |
| 2006/0007644 A1 * | 1/2006 | Huilgol | G06F 1/1679 361/679.07 |
| 2009/0145337 A1 * | 6/2009 | Shen | G06F 1/1622 108/39 |
| 2011/0233951 A1 * | 9/2011 | Zekavica | B60N 2/305 296/24.34 |
| 2012/0318949 A1 * | 12/2012 | Braun | B60N 2/0702 248/429 |
| 2014/0265416 A1 * | 9/2014 | Pequignot, II | B60N 2/0715 296/65.14 |
| 2014/0319867 A1 * | 10/2014 | von Rothkirch und Panthen | B60N 3/004 296/24.34 |
| 2015/0183355 A1 * | 7/2015 | Chang | B60N 3/002 108/44 |
| 2016/0090180 A1 * | 3/2016 | Thompson | B60N 3/002 297/144 |
| 2018/0279790 A1 * | 10/2018 | Pozzi | B64D 11/0638 |
| 2018/0281962 A1 * | 10/2018 | Pozzi | B64D 11/0638 |
| 2019/0193538 A1 * | 6/2019 | Carter | B60J 7/198 |

* cited by examiner

LOCK ASSEMBLY

CROSS-REFERENCE TO RELATED APPLICATION

The present application is a continuation of U.S. patent application Ser. No. 15/815,166, filed Nov. 16, 2017, entitled WORK SURFACE, the entire disclosure of which is hereby incorporated herein by reference.

FIELD OF THE DISCLOSURE

The present disclosure generally relates to a lock assembly.

BACKGROUND OF THE INVENTION

A common concern with deployable apparatus' in vehicles, such as work surfaces, is preventing unintended movement of the apparatus while in use or when the vehicle is in motion. One solution to this concern is to increase the effort required to enable actuation of the deployable apparatus. However, this approach can make unlocking the apparatus more difficult for the user and decrease the quality of the user experience. Accordingly, new solutions are needed to address this concern that do not negatively impact the quality of the user's experience.

SUMMARY OF THE INVENTION

According to a first aspect of the present disclosure, a work surface is provided with a lock assembly. The lock assembly includes an actuator plate and a locking plate. The actuator plate includes a pin. The locking plate includes an angled slot that receives the pin of the actuator plate. Actuation of the actuator plate in a first direction causes the pin to move within the angled slot of the locking plate. The movement of the pin within the angled slot causes movement of the locking plate in a second direction, thereby actuating the locking plate between a locked configuration and an unlocked configuration.

Embodiments of the first aspect of the present disclosure can include any one or a combination of the following features:
  the actuator plate includes a first slot that confines the actuator plate to movement along a first axis of travel that is at least partially defined by the first direction;
  the locking plate includes a second slot that confines the locking plate to movement along a second axis of travel that is at least partially defined by the second direction;
  a fastener that extends through the first slot of the actuator plate and the second slot of the locking plate;
  the fastener aids in guiding the actuation of the actuator plate along the first axis of travel and the fastener aids in guiding the actuation of the locking plate along the second axis of travel;
  the first axis of travel and the second axis of travel are angularly offset from one another;
  the first axis of travel and the second axis of travel are coplanar with one another;
  the angular offset between the first axis of travel and the second axis of travel is ninety-degrees;
  the work surface is coupled to a slide-plate assembly;
  the slide-plate assembly is coupled to an underside of the work surface;
  the slide-plate assembly is positioned between the work surface and a bin assembly;
  the slide-plate assembly is slidably coupled to the bin assembly; and
  the coupling between the work surface and the slide-plate assembly enables a slidable coupling of the work surface to the bin assembly.

According to a second aspect of the present disclosure, a work surface is provided with a lock assembly. The lock assembly includes an actuator plate and a locking plate. The actuator plate includes a pin and a first slot. The first slot confines the actuator plate to movement along a first axis of travel. The locking plate includes a second slot and an angled slot. The second slot confines the locking plate to movement along a second axis of travel. The angled slot receives the pin of the actuator plate. Actuation of the actuator plate along the first axis of travel causes the pin to move within the angled slot of the locking plate. The movement of the pin within the angled slot causes movement of the locking plate along the second axis of travel, thereby actuating the locking plate between a locked configuration and an unlocked configuration. A fastener extends through the first slot of the actuator plate and the second slot of the locking plate. The fastener aids in guiding the actuation of the actuator plate along the first axis of travel and the fastener aids in guiding the actuation of the locking plate along the second axis of travel. The first axis of travel and the second axis of travel are angularly offset from one another.

Embodiments of the second aspect of the present disclosure can include any one or a combination of the following features:
  the first axis of travel and the second axis of travel are coplanar with one another;
  the work surface is coupled to a slide-plate assembly;
  the slide-plate assembly is coupled to an underside of the work surface;
  the slide-plate assembly is positioned between the work surface and a bin assembly;
  the slide-plate assembly is slidably coupled to the bin assembly; and
  the coupling between the work surface and the slide-plate assembly enables a slidable coupling of the work surface to the bin assembly.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 5:
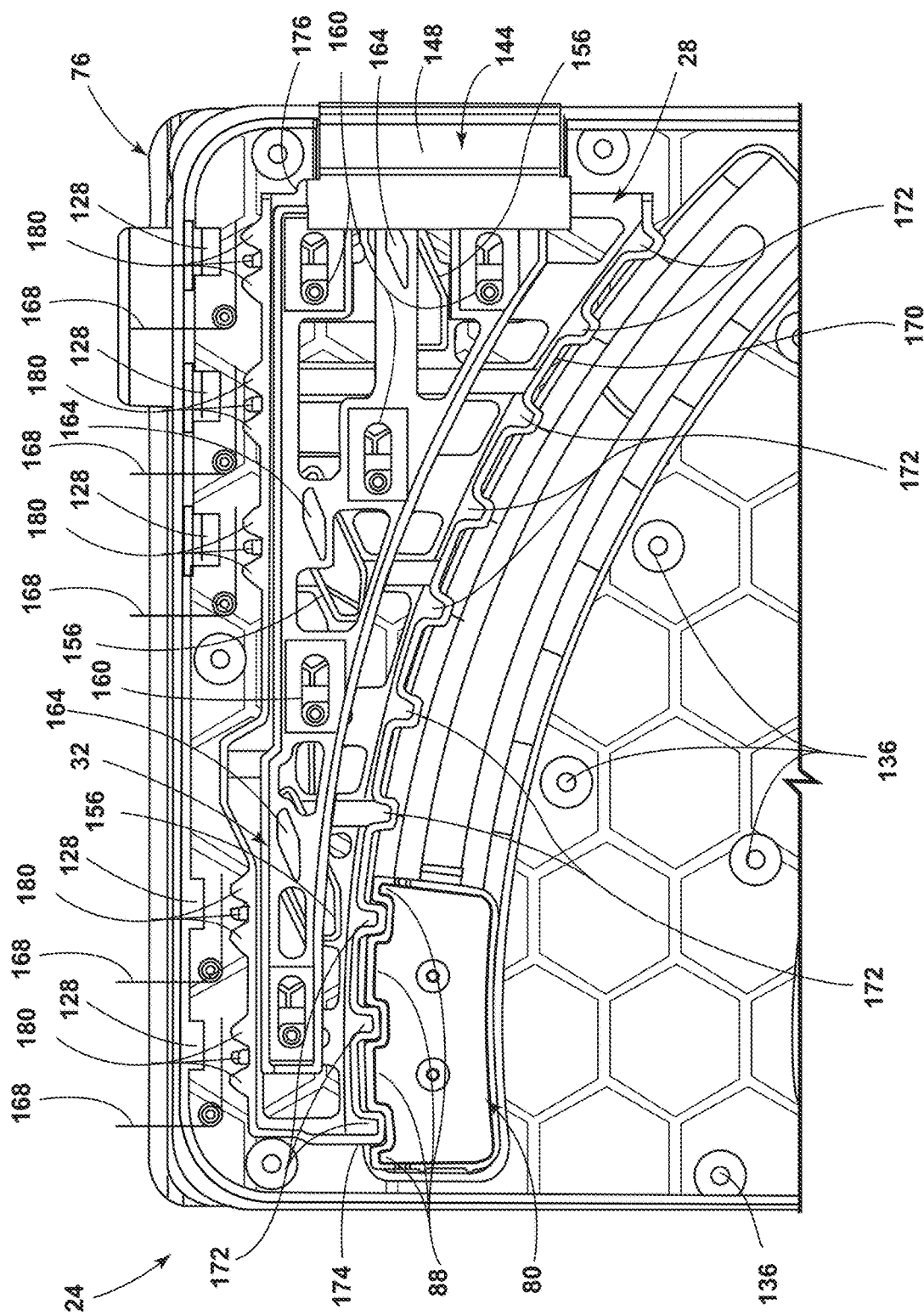
FIG. 5 is a top view of a lock mechanism of the work surface, illustrating a locked configuration.
Figure 6:
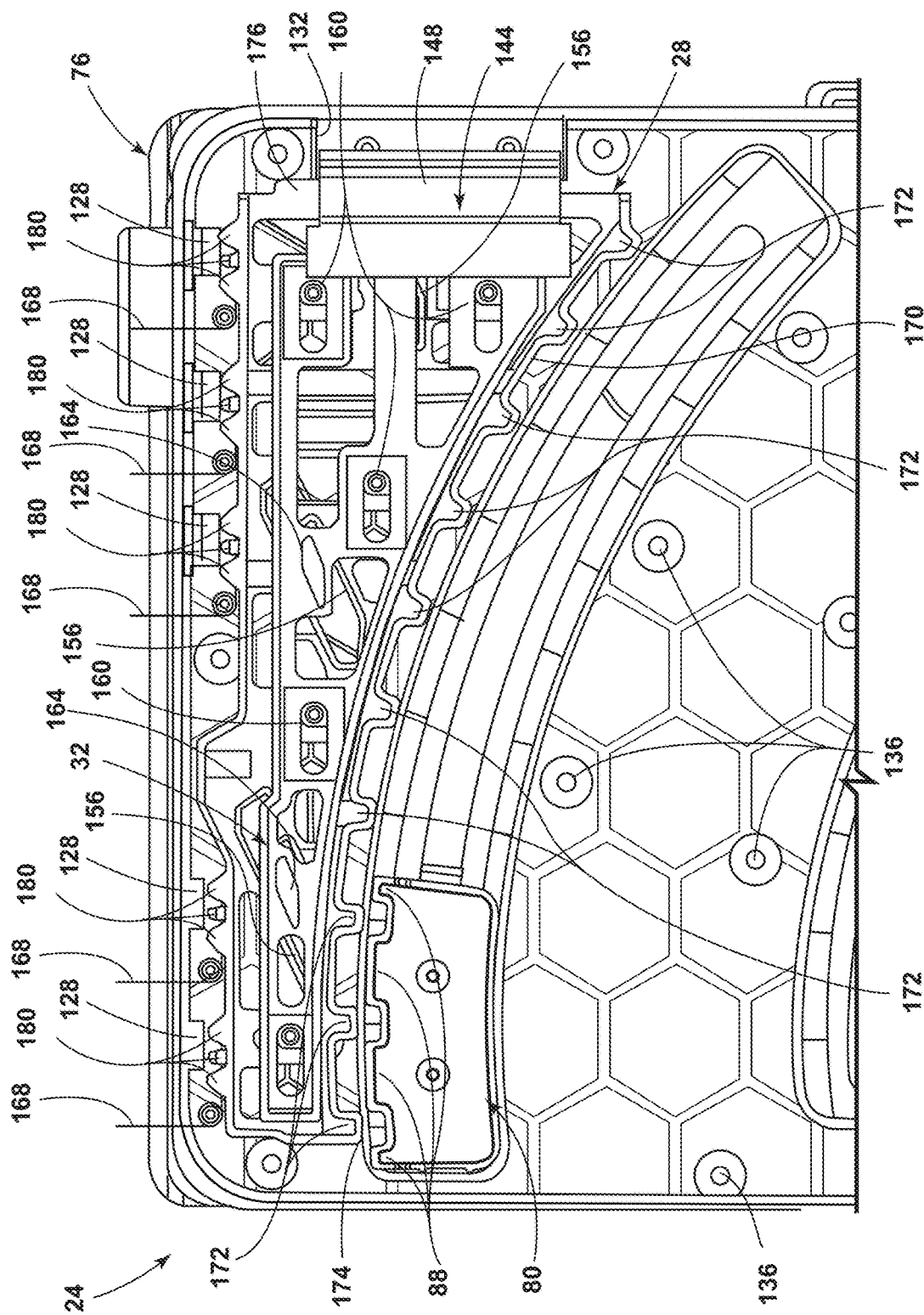
FIG. 6 is a top view of the lock mechanism of the work surface, illustrating an unlocked configuration.
Figure 7:
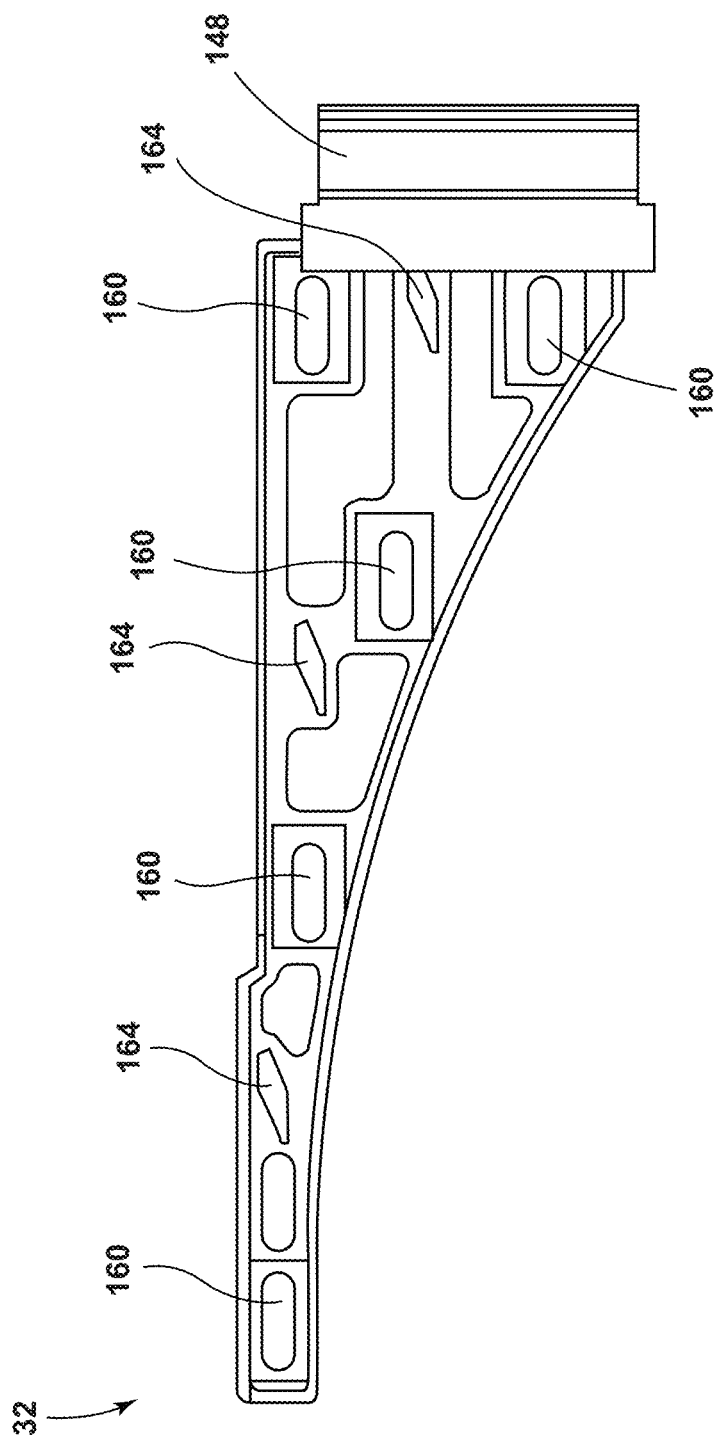
FIG. 7 is a top view of an actuator plate of the lock mechanism.
Figure 8:
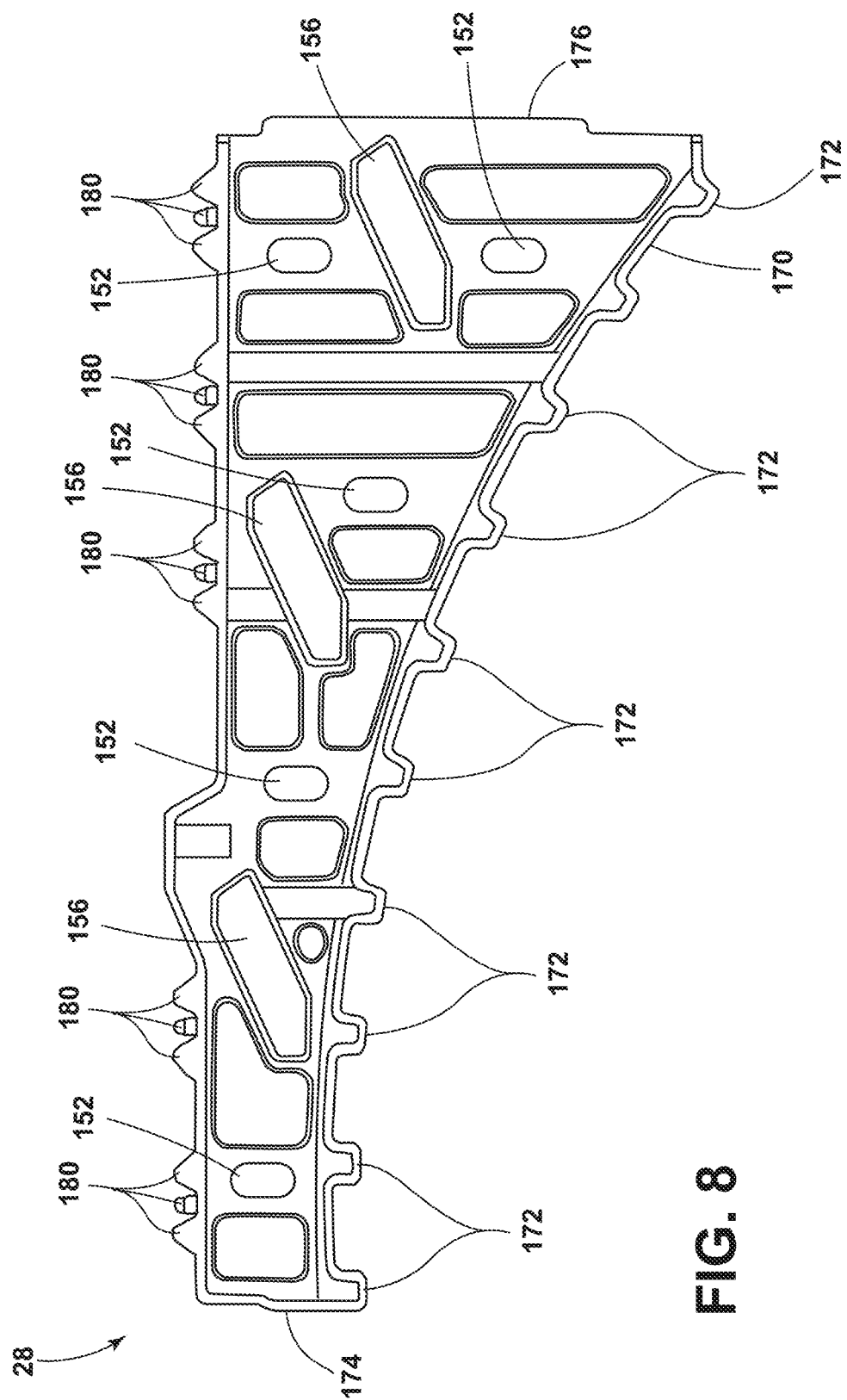
FIG. 8 is a top view of a locking plate of the lock mechanism.

For purposes of description herein, the terms "upper," "lower," "right," "left," "rear," "front," "vertical," "horizontal," and derivatives thereof shall relate to the concepts as oriented in FIG. 5. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a work surface. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-11, reference numeral 20 generally designates a vehicle. The vehicle 20 includes a work surface 24, a locking plate 28, and an actuator plate 32. The locking plate 28 retains the work surface 24 in various positions. The actuator plate 32 engages with the locking plate 28 and is configured to actuate the locking plate 28 between a locked (FIG. 5) and an unlocked (FIG. 6) configuration. The actuator plate 32 is movable in a first direction and the locking plate 28 is movable in a second direction. In some examples, the first and second directions are non-parallel to one another. For example, the first and second directions may be substantially perpendicular to one another.

Referring again to FIG. 1, a cabin 36 of the vehicle 20 often includes a front row of seats 40 and a rear row of seats 44. The front and rear row of seats 40, 44 typically includes a plurality of seating assemblies 48. The seating assemblies 48 include a seatbase 52 and a seatback 56. In one example, the work surface 24 may be operably coupled to a rearward side of the seatback 56 of a middle seat 60 in the front row of seats 40. Accordingly, the work surface 24 may be available to an occupant of the vehicle 20 upon placing the middle seat 60 in a forward-dumped position, as depicted here.

Figure 1:
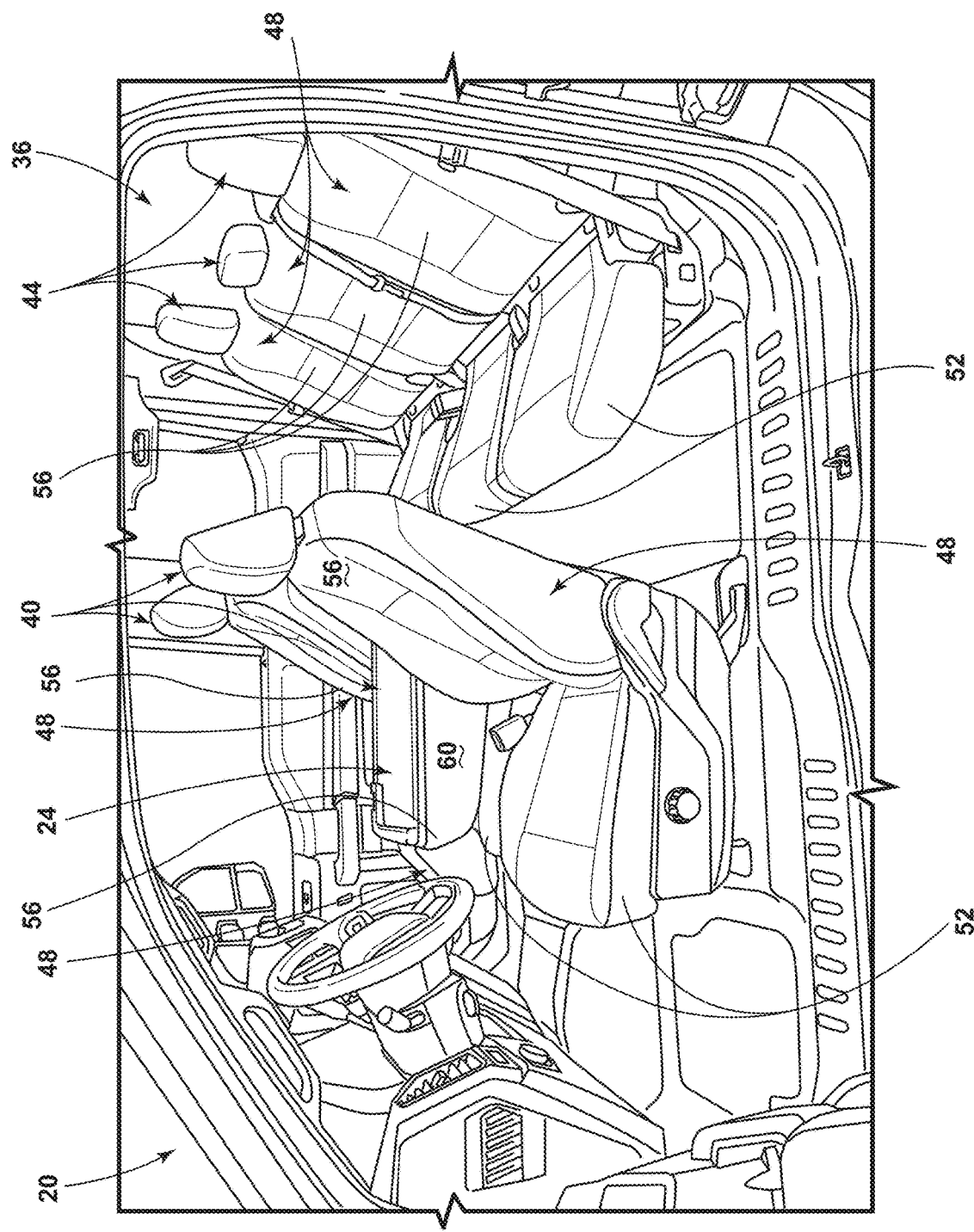
FIG. 1 is a side perspective view of a cabin of a vehicle, illustrating a front row of seats and a rear row of seats.
Figure 2:
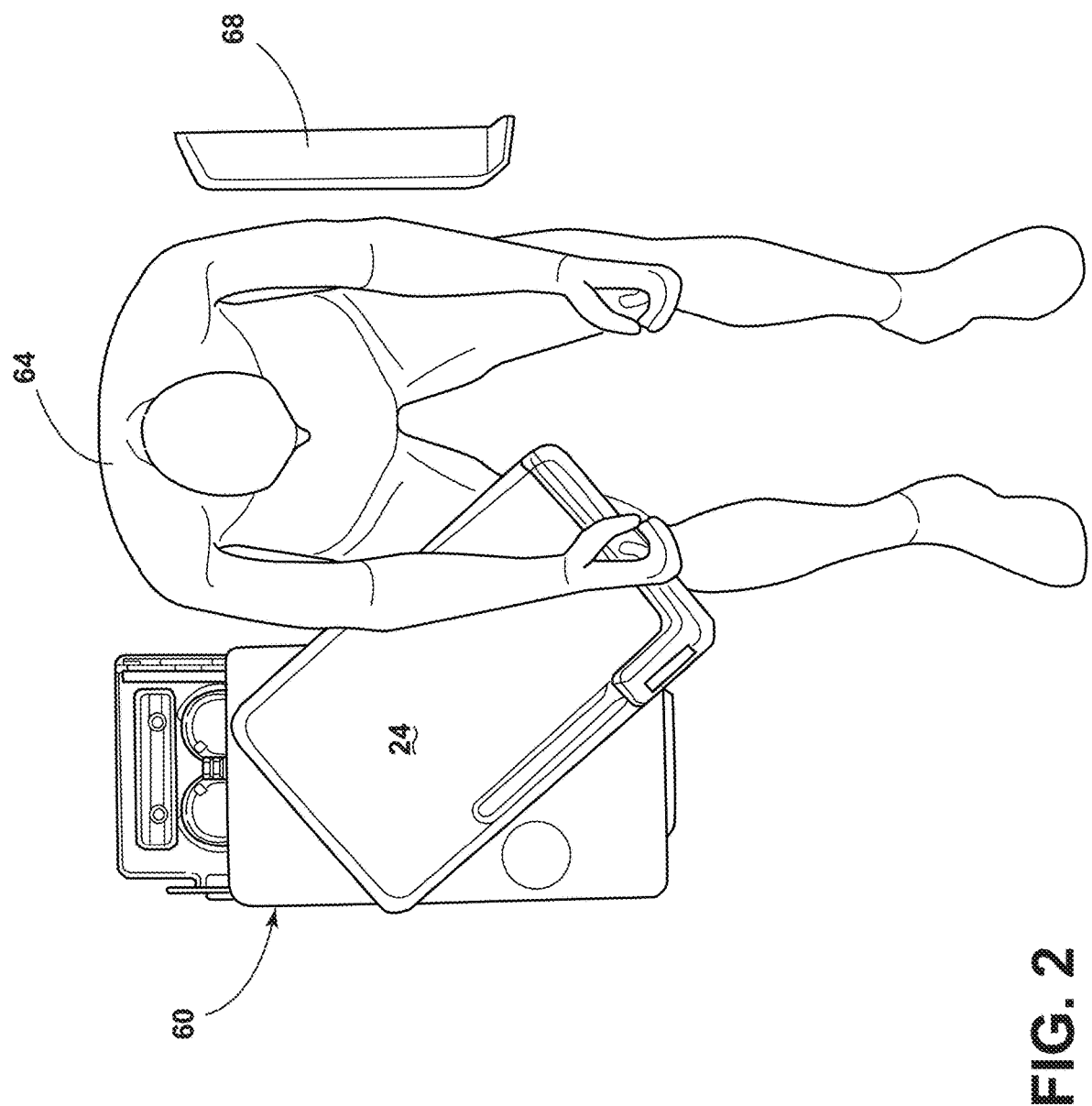
FIG. 2 is a top view of a middle seat in a forward-dumped position, illustrating a work surface pivoted toward an occupant.

Referring now to FIG. 2, an occupant 64 is shown seated in the front row of seats 40 between the middle seat 60 and an armrest 68 of a door of the vehicle 20 (FIG. 1). The occupant 64 is in a driving position with their arms outstretched toward a steering wheel of the vehicle 20. The work surface 24 is shown in a deployed position. The deployed position of the work surface 24 depicted here may be a partially-deployed position or a fully-deployed position. In either instance, the work surface 24 may be rotated toward the occupant 64 such that the work surface 24 is deployed from the stowed position (FIG. 1). Upon deployment of the work surface 24, the work surface 24 may assume an angled orientation relative to the occupant 64 such that the occupant 64 is presented with an ergonomic area to fill out paperwork, store items within reach, work on an electronic device (e.g., laptop), or generally increase the functionality of the cabin 36 of the vehicle 20.

Figure 3:
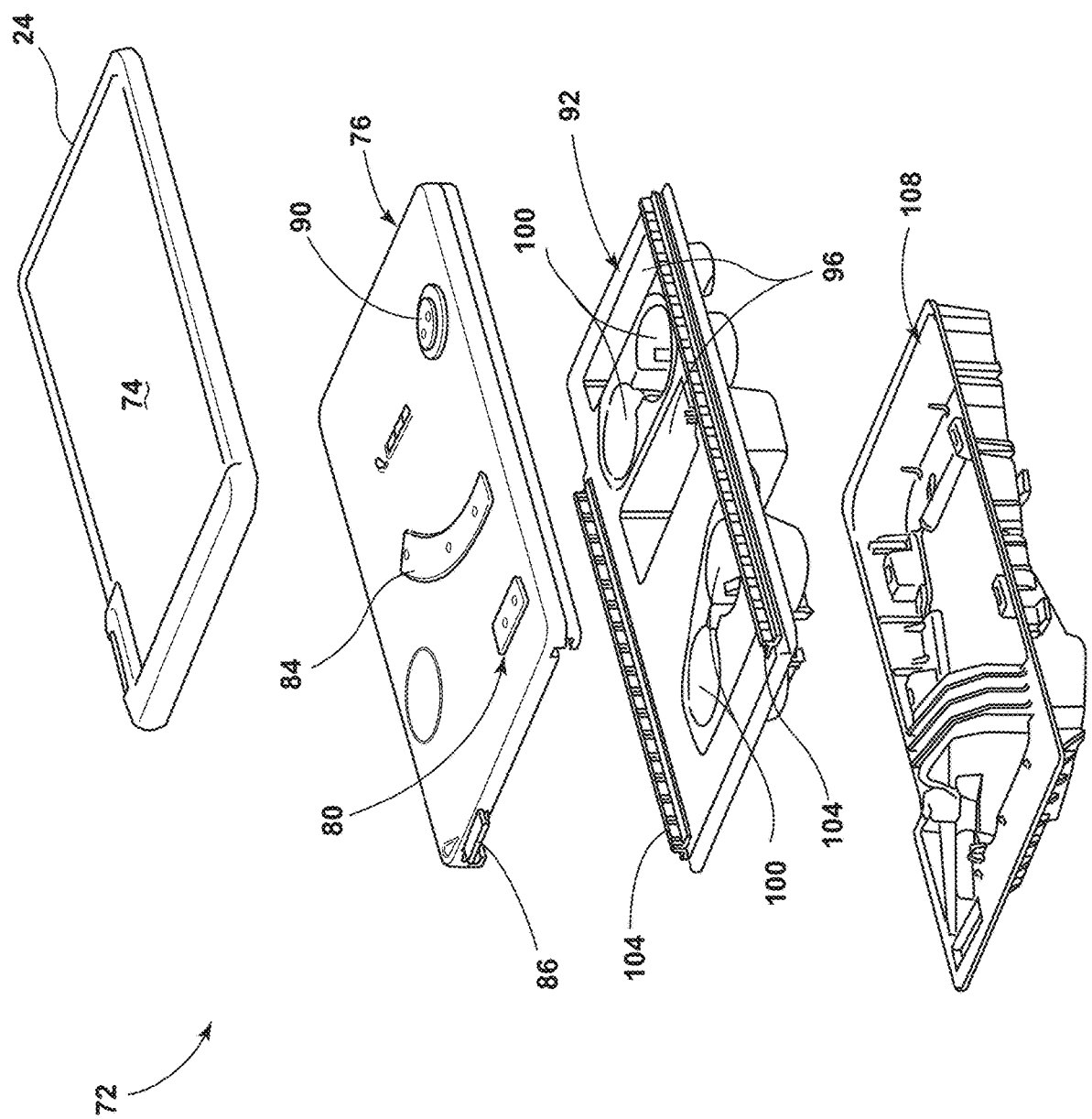
FIG. 3 is an exploded view of the work surface, according to one embodiment.

Referring to FIG. 3, the work surface 24 may be one component of a larger assembly, such as a productivity assembly 72. The work surface 24 may be an uppermost component of the productivity assembly 72 and include a top portion 74 that provides a substantially smooth and aesthetically pleasing surface for the occupant 64 (FIG. 2) to work upon. The work surface 24 may be operably coupled to a slide-plate assembly 76. The slide-plate assembly 76 may include a first puck 80 and a second puck 84. A puck as used herein is defined as a feature of the productivity assembly 72 that is configured to aid in guiding the work surface 24 through a deployment path as the work surface 24 is transitioned between the stowed position and the fully-deployed position. Additionally, the puck, as used herein, may be configured to aid in retaining the work surface 24 in the various positions during a locked configuration. The first and/or the second puck 80, 84 may aid in guiding the deployment and stowing of the work surface 24. In some examples, the first and/or the second puck 80, 84 may include teeth 88 (FIG. 5) that are configured to engage with the locking plate 28. The slide-plate assembly 76 may further include a pull tab 86 that serves as a gripping surface to actuate the slide-plate assembly 76 in a forward and/or rearward direction and a pivot tab 90 that serves as a pivot point or rotational axis for the work surface 24. The slide-plate assembly 76 may be slidably coupled to a bin assembly 92. The bin assembly 92 may include one or more storage compartments 96 and/or one or more cup holders 100. The bin assembly 92 may further include one or more slide tracks 104 that are positioned on one or more sides of the bin assembly 92 such that the slidable coupling of the slide-plate assembly 76 to the bin assembly 92 may be guided along the slide tracks 104. In operation, the work surface 24 may remain in the stowed position while operably coupled to the slide-plate assembly 76 as the slide-plate assembly 76 is actuated along the slide tracks 104 to reveal the bin assembly 92. Said another way, the work surface 24 and the slide-plate assembly 76 may be actuated independent of one another. The productivity assembly 72 may include a support member 108, such as a substrate, as a bottommost portion of the productivity assembly 72.

Figure 4:
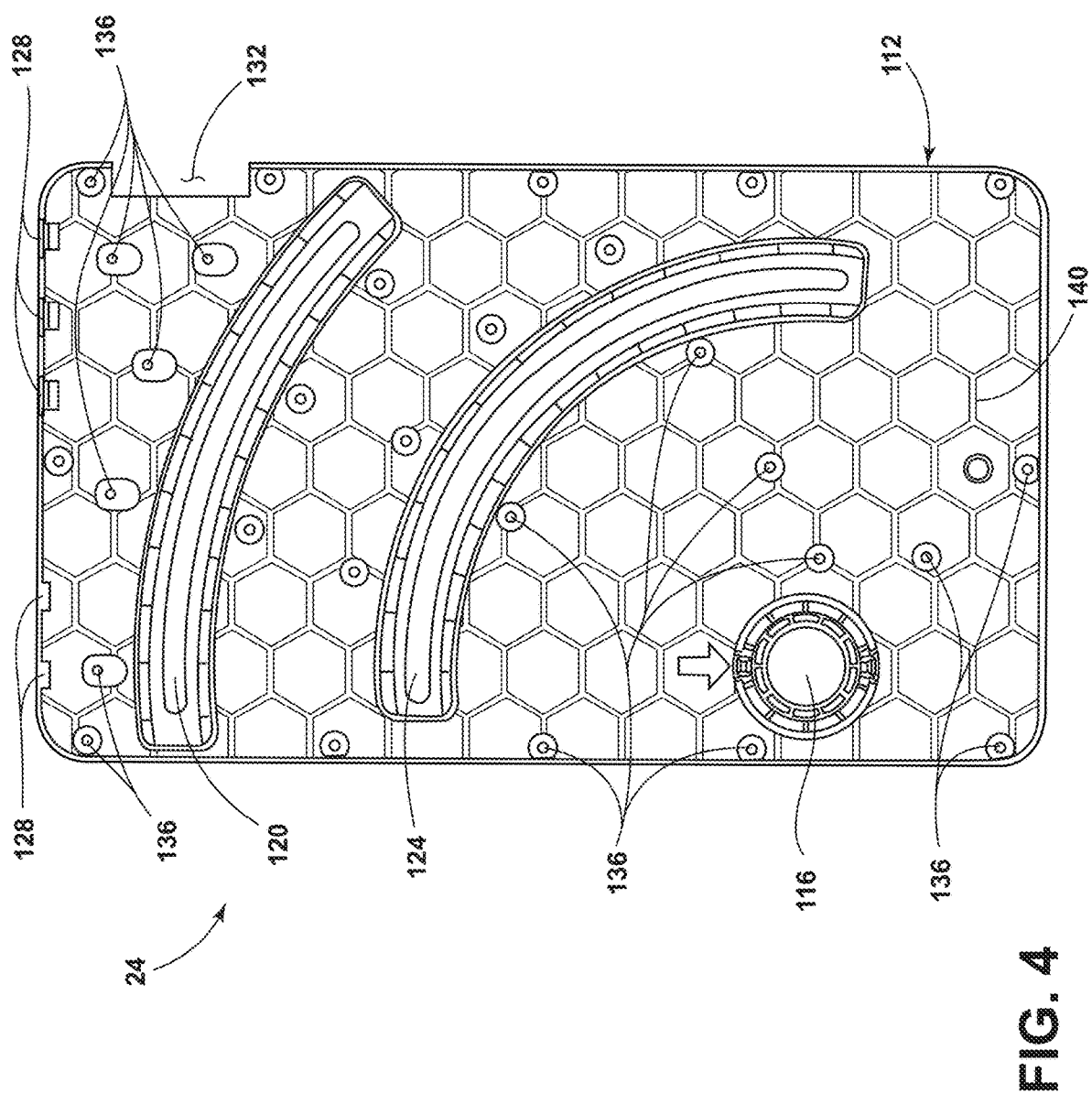
FIG. 4 is a top view of a bottom portion of the work surface, illustrating various features.

Referring now to FIG. 4, the work surface 24 may further include a bottom portion 112. The bottom portion 112 may define a pivot aperture 116, a first puck track 120, and a second puck track 124. The bottom portion 112 may further include a plurality of standoffs 128 and a button cutout 132. The top portion 74 (FIG. 3) and the bottom portion 112 of the work surface 24 may be operably coupled to one another by one or more fasteners. The bottom portion 112 may further define one or more fastener apertures 136 that are utilized for coupling the top portion 74 to the bottom portion 112. The bottom portion 112 may include a series of reinforcements, such as a hexagonal pattern 140 that protrudes upward from the surface of the bottom portion 112. The series of reinforcements may provide some rigidity to the bottom portion 112 that may aid in distributing or generally supporting a load applied to the work surface 24 (e.g., a laptop or resting arm of the occupant).

Referring to FIGS. 5-8, a locking mechanism 144 of the work surface 24 is shown, according to one example. The locking mechanism 144 includes the locking plate 28, the actuator plate 32, the first puck 80, the standoffs 128, the button cutout 132, and a button 148. In the depicted example, the actuator plate 32 is positioned on top of the locking plate 28. The locking plate 28 and the actuator plate 32 are operably coupled to one another, for example, by one or more of the fasteners, which may extend through the fastener apertures 136 and pass through the locking plate 28 and/or the actuator plate 32. Alternatively, the locking plate 28 and the actuator plate 32 may be sandwiched between the slide-plate assembly 76 and a retention plate. In such an example, the fasteners may directly couple to the slide-plate assembly 76 and the retention plate while indirectly coupling to the locking plate 28 and the actuator plate 32. The locking plate 28 may be equipped with one or more vertical slots 152 and one or more angled slots 156. The actuator plate 32 may be equipped with one or more horizontal slots 160 and one or more pins 164. The pins 164 may be angled to be complementary to, or generally correspond with, the angled slots 156. For example, the pins 164 may have a generally diamond-shaped profile. In operation, a fastener may be co-localized and pass through one or more of the vertical slots 152 and one or more of the horizontal slots 160. Additionally, the angled slots 156 and the pins 164 may be coupled with one another. Accordingly, upon actuation of the button 148, the actuator plate 32 is actuated in the first direction, such as to the left, which induces motion of the pins 164 within the angled slots 156. Then, the horizontal motion of the actuator plate 32 toward the left by the button 148 is translated into vertical motion in an upward direction of the locking plate 28 that follows the path of the vertical slots 152, thereby placing the locking plate 28 in the unlocked configuration (FIG. 6) with the first puck 80.

Referring again to FIGS. 5-8, the fasteners and the horizontal slots 160 are configured to prevent vertical motion of the actuator plate 32 while permitting the horizontal motion described above. Similarly, the fasteners and the vertical slots 152 are configured to prevent horizontal motion of the locking plate 28 while permitting the vertical motion described above. Accordingly, the actuator plate 32 translates the horizontal actuation of the button 148 into vertical motion of the locking plate 28 such that the working surface 24 may be actuated between the stowed position and the fully-deployed position by the occupant 64 (FIG. 2). A first side 170 of the locking plate 28 includes a plurality of protrusions 172. In various examples, the protrusions 172 are provided with a first shape at a first end 174 of the first side 170 and a second shape at a second end 176 of the first side 170, as will be discussed in further detail below. The first shape may have a generally rectangular profile and the second shape may have a generally saw-tooth profile. The locking plate 28 may be biased toward the locked configuration by one or more biasing members 168 (e.g., springs, compression springs, torsion springs, leaf springs, and the like). The biasing members 168 may each be co-localized with a fastener and positioned between the standoffs 128 on the work surface 24 and bracing surfaces 180 on the locking plate 28. The bracing surfaces 180 may be passive contact points for the biasing member 168 or may actively engage and/or retain the biasing member 168 associated therewith. As shown, the biasing members 168 resemble torsion springs that have yet to be placed in a loaded position where a first leg of the torsion spring engages with the associated standoff 128 and a second leg of the torsion spring engages with the associated bracing surface 180. In various examples, the locking plate 28 may have a first width at the first end 174 and a second width at the second end 176. The second width may be greater than the first width in some examples such that the first side 170 of the locking plate 28 is generally arcuate in shape.

Figure 9A:
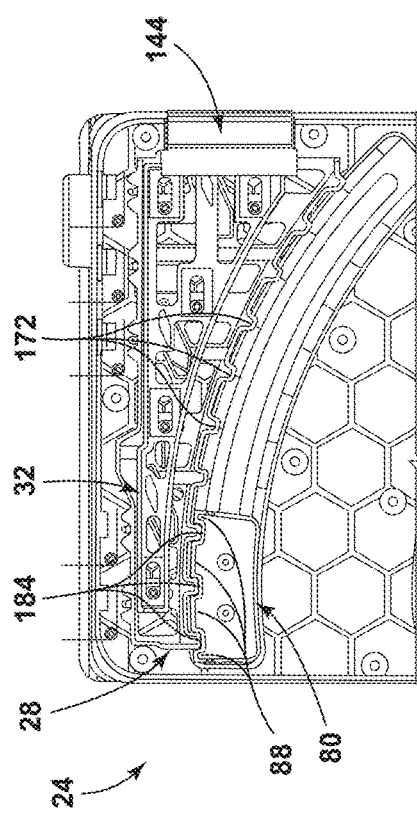
FIG. 9A is a top view of the locking mechanism of the work surface, illustrating a stowed position, according to one embodiment.
Figure 9C:
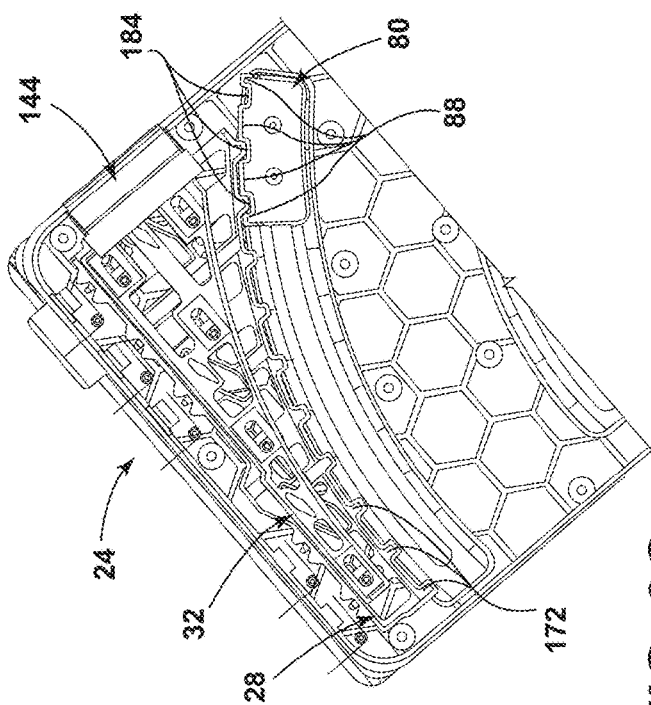
FIG. 9C is a top view of the locking mechanism of the work surface, illustrating a fully-deployed position, according to one embodiment.
Figure 9B:
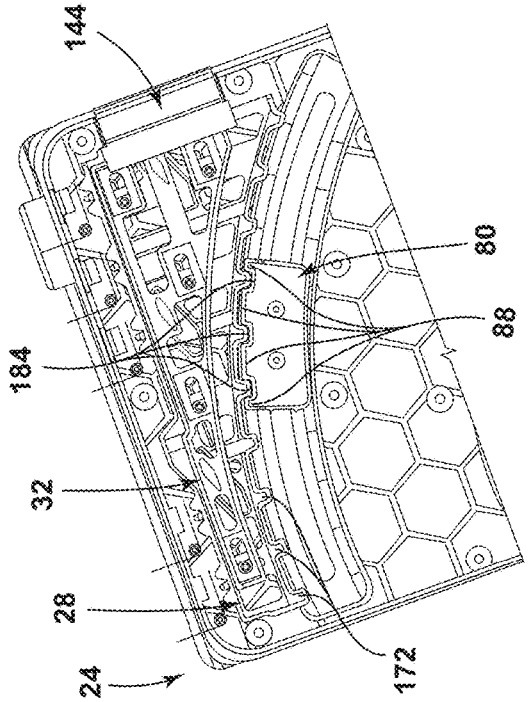
FIG. 9B is a top view of the locking mechanism of the work surface, illustrating a partially-deployed position, according to one embodiment.

Referring now to FIGS. 9A-9C, the work surface 24 is shown absent the top portion 74 (FIG. 3) to reveal internal and/or underlying features. The work surface 24 is shown with the locking mechanism 144 in the locked configuration. FIG. 9A depicts the work surface 24 in the stowed position, which may alternatively be referred to as a zero degree)(0°) displacement position. FIG. 9B depicts the work surface 24 in a partially-deployed position. For example, the partially-deployed position may be displaced from the stowed position by an angular displacement of about twenty degrees) (20°). FIG. 9C depicts the work surface 24 in the fully-deployed position, which may represent an angular displacement from the stowed position of about forty degrees)(40°). As depicted, the first puck 80 defines recessed portion 184 that in turn define the teeth 88 on either side of the recessed portions 184. In the depicted example, the first puck 80 is equipped with four teeth 88 that are defined by the recessed portions 184. The teeth 88 that are positioned as the middle two of the four teeth 88 are configured to be positioned to correspond with a distance between the protrusions 172.

Referring again to FIGS. 9A-9C, in the depicted examples, the first puck 80 remains stationary or is generally fixed while the work surface 24 is actuated between the stowed position and the fully-deployed position. While the fully-deployed position has been discussed as being rotationally displaced from the stowed position by an angular displacement of about forty degrees)(40°), it is contemplated that the fully-deployed position may be represented by alternative angular displacements from the stowed position.

For example, the fully-deployed position may be angularly displaced from the stowed position by at least about ten degrees (10°), at least about twenty degrees (20°), at least about thirty degrees (30°), at least about forty degrees (40°), at least about fifty degrees (50°), at least about sixty degrees (60°), at least about seventy degrees (70°), at least about eighty degrees (80°), at least about ninety degrees (90°), less than about one-hundred degrees (100°), less than about one-hundred-ten degrees (110°), less than about one-hundred-twenty degrees (120°), and/or combinations or ranges thereof. In various examples, the work surface 24 may be provided with a plurality of positions between the stowed position and the fully-deployed position. For example, the plurality of positions, which may include the stowed and/or the fully-deployed positions, may be at least about five positions, at least about seven positions, at least about nine positions, at least about eleven positions, at least about thirteen positions, at least about fifteen positions, and/or combinations or ranges thereof. In some examples, the plurality of protrusions 172 and the first puck 80 interact to provide engagement points between the stowed position and the fully-deployed position. The engagement points may be spaced at increments of about two degrees (2°), about five degrees (5°), about ten degrees (10°), about fifteen degrees (15°), about twenty degrees (20°), and/or combinations and ranges thereof.

Figure 10:
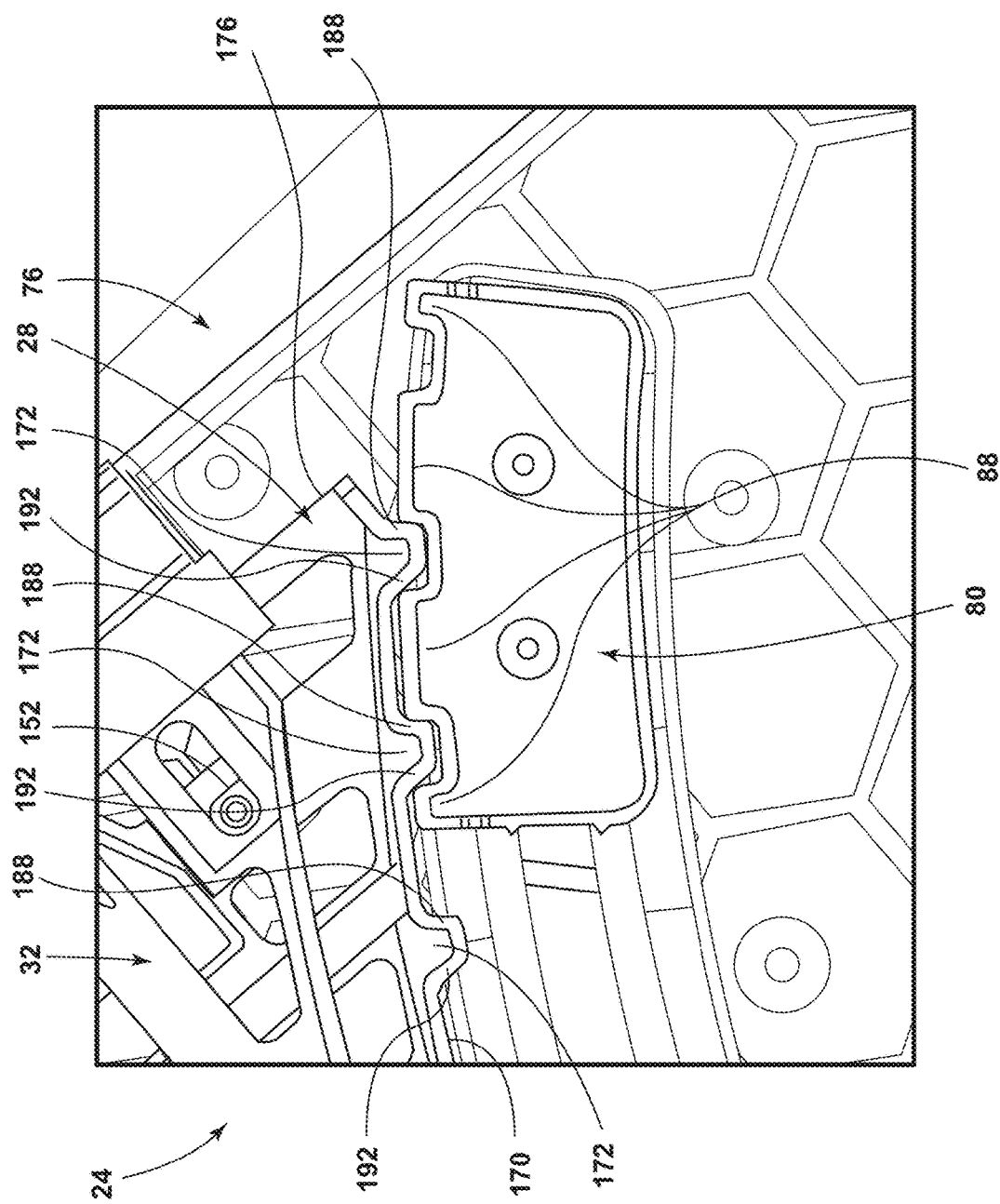
FIG. 10 is a top view of a first puck of the lock mechanism, illustrating the engagement between the first puck and the locking plate when in the locked configuration.
Figure 11:
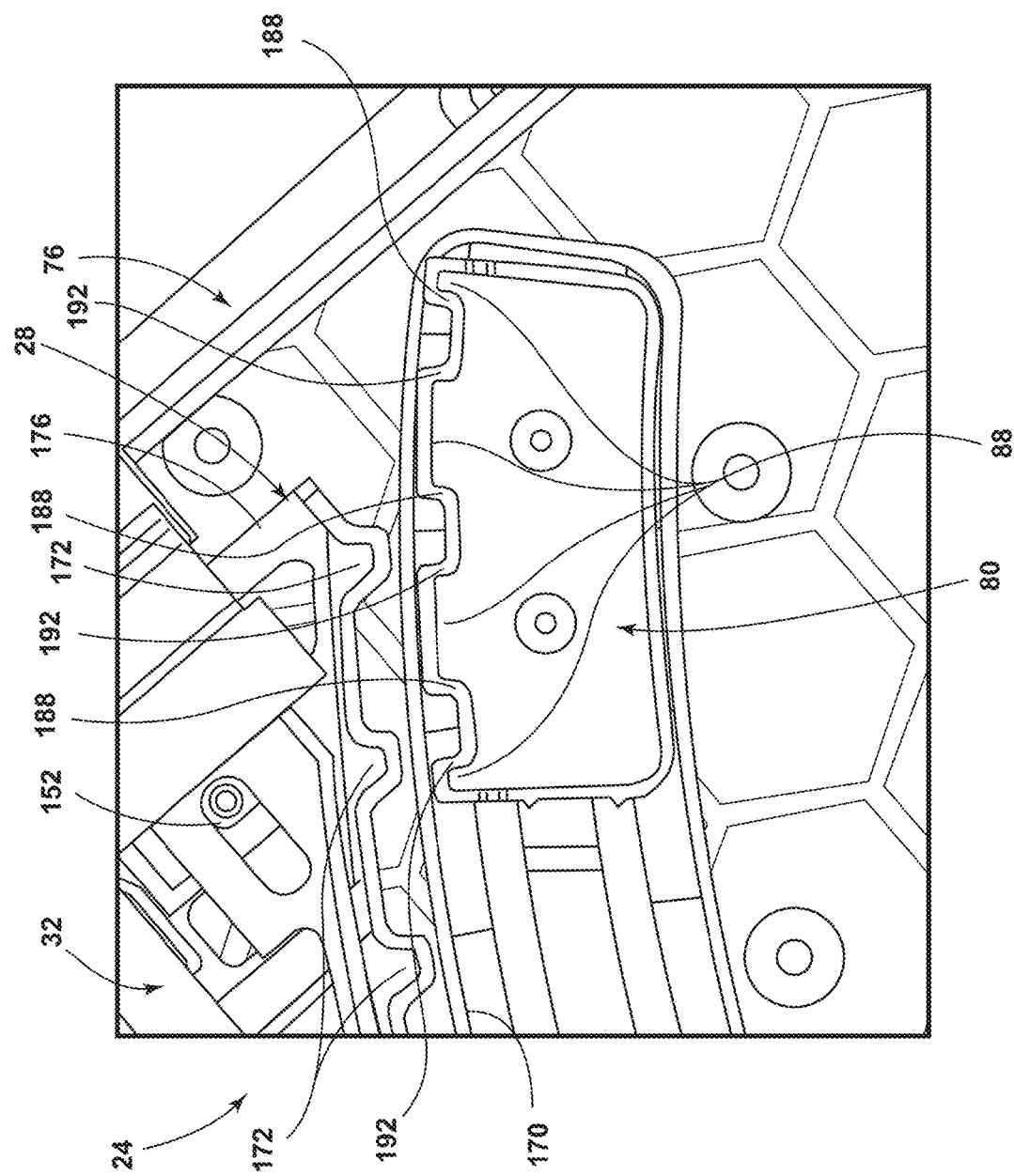
FIG. 11 is a top view of the first puck of the lock mechanism, illustrating the locking plate in the unlocked configuration.

Referring to FIGS. 10 and 11, the engagement between the teeth 88 of the first puck 80 and the protrusions 172 of the locking plate 28 is shown in further detail. In the depicted example, the work surface 24 is in the fully-deployed position such that the protrusions 172 positioned at the second end 176 of the locking plate 28 are engaged with the teeth 88 of the first puck 80 (FIG. 10). The protrusions 172 at the second end 176 of the locking plate 28 may be configured as non-symmetrical protrusions. For example, the protrusions 172 at the second end 176 may generally resemble a saw-toothed profile that includes a first region 188 and a second region 192. The first region 188 of the protrusions 172 may be configured to engage with the teeth 88 of the first puck 80 such that the work surface 24 is retained in the desired position. In some examples, the first region 188 may be provided at an angle that is perpendicular to the first side 170 of the locking plate 28. The second region 192 of the protrusions 172 may be configured to be at an angle that is parallel to the direction of actuation of the locking plate 28. For example, the second region 192 may be provided at an angle that is parallel to the vertical slots 152 on the locking plate 28. In the depicted example, the first side 170 of the locking plate 28 is arcuate in shape. Accordingly, the angle that the first region 188 and/or the second region 192 is provided relative to the first side 170 and/or the slide-plate assembly 76 may change in a continuous manner as the locking plate 28 is traversed from the first end 174 (FIG. 5) to the second end 176.

A common concern with deployable apparatus' in the vehicle 20 is preventing free rotation of the apparatus while in use or when the vehicle 20 is in motion. If the apparatus were to move while in use, then the user would have a difficult time using the apparatus to, for example, write on a piece of paper or use a laptop. Even worse would be if the apparatus were to move while the vehicle 20 was in motion. If the apparatus were to move while the vehicle 20 was in motion (e.g., in front of the occupant 64), then the apparatus will have created a potential safety hazard or physically harmed the occupant 64. One solution to this problem is to increase the effort required to enable actuation of the deployable apparatus, for example, by increasing the strength, spring constant, or pre-tensioning of the biasing members 168. However, this approach can make unlocking the apparatus more difficult for the occupant 64 and decrease the quality of the user experience.

The work surface 24 of the present disclosure provides a natural and ergonomic actuation of the button 148 that can be accomplished one-handed and does not negatively affect the quality of the user experience. For example, the button 148 may be actuated to unlock the work surface 24 by applying a force that is less than about fifteen Newtons (15N). Additionally, the design of the locking mechanism 144 may decrease the effort that is exerted to deploy the work surface 24 by providing slanted surfaces, such as the first region 188 of the protrusions 172, which are less likely to bind with the teeth 88 on the first puck 80 as the work surface 24 is deployed. For example, if the button 148 has not been actuated enough to fully clear the teeth 88, then the slanted surfaces aid in actuating the locking mechanism 144 the rest of the way through contact with the first puck 80. Further, the locking mechanism 144 prevents unintentional deployment of the work surface 24 by providing the second region 192 of the protrusions 172 that are configured to be perpendicular to the direction of travel of the work surface 24 such that the locked configuration resists inertial forces that may act on the work surface 24 while the work surface 24 is in use or the vehicle 20 is in motion. The second region 192 of the protrusions 172 and the teeth 88 of the first puck 80 are configured to have a contact surface area when in the locked configuration that covers a substantial portion of the surface area available on the teeth 88 where the second region 192 and the teeth 88 engage. In general, the locking mechanism 144 is configured to minimize reaction forces in the direction of unlocking that would cause the locking mechanism 144 to unlock in an impact event (e.g., a vehicle crash).

According to various aspects of the disclosure, the work surface 24 is designed to resist unintentional deployment by, for example, inertial forces that exist during normal operation of the vehicle 20 (e.g., acceleration and deceleration in various directions and at various rates). Accordingly, actuation of the button 148 can be configured to prioritize push-button effort concerns to improve the quality of the user's experience. Additionally, the productivity assembly 72 may be heavier without risking unintentional deployment of the work surface 24 and while not increasing the pre-tensioning (e.g., spring constant) of the biasing members 168.

Therefore, the productivity assembly 72 may be more complex, such as having more features and/or functionality, while meeting various robustness requirements without risking unintentional unlocking of the locking mechanism 144.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A work surface having a lock assembly, the lock assembly comprising:
    an actuator plate comprising a pin; and
    a locking plate comprising an angled slot that receives the pin of the actuator plate, wherein actuation of the actuator plate in a first direction causes the pin to move within the angled slot of the locking plate, and wherein the movement of the pin within the angled slot causes movement of the locking plate in a second direction, thereby actuating the locking plate between a locked configuration and an unlocked configuration.

2. The work surface having a lock assembly of claim 1, wherein the actuator plate comprises a first slot that confines the actuator plate to movement along a first axis of travel that is at least partially defined by the first direction.

3. The work surface having a lock assembly of claim 2, wherein the locking plate comprises a second slot that confines the locking plate to movement along a second axis of travel that is at least partially defined by the second direction.

4. The work surface having a lock assembly of claim 3, further comprising:
    a fastener that extends through the first slot of the actuator plate and the second slot of the locking plate.

5. The work surface having a lock assembly of claim 4, wherein the fastener aids in guiding the actuation of the actuator plate along the first axis of travel, and wherein the fastener aids in guiding the actuation of the locking plate along the second axis of travel.

6. The work surface having a lock assembly of claim 3, wherein the first axis of travel and the second axis of travel are angularly offset from one another.

7. The work surface having a lock assembly of claim 6, wherein the first axis of travel and the second axis of travel are coplanar with one another.

8. The work surface having a lock assembly of claim 6, wherein the angular offset between the first axis of travel and the second axis of travel is ninety-degrees.

9. The work surface having a lock assembly of claim 1, wherein the work surface is coupled to a slide-plate assembly.

10. The work surface having a lock assembly of claim 9, wherein the slide-plate assembly is coupled to an underside of the work surface.

11. The work surface having a lock assembly of claim 9, wherein the slide-plate assembly is positioned between the work surface and a bin assembly.

12. The work surface having a lock assembly of claim 11, wherein the slide-plate assembly is slidably coupled to the bin assembly.

13. The work surface having a lock assembly of claim 12, wherein the coupling between the work surface and the slide-plate assembly enables a slidable coupling of the work surface to the bin assembly.

14. A work surface having a lock assembly, the lock assembly comprising:
    an actuator plate, comprising:
        a pin; and
        a first slot that confines the actuator plate to movement along a first axis of travel;
    a locking plate, comprising:
        a second slot that confines the locking plate to movement along a second axis of travel; and
        an angled slot that receives the pin of the actuator plate, wherein actuation of the actuator plate along the first axis of travel causes the pin to move within the angled slot of the locking plate, and wherein the movement of the pin within the angled slot causes movement of the locking plate along the second axis of travel, thereby actuating the locking plate between a locked configuration and an unlocked configuration; and
    a fastener that extends through the first slot of the actuator plate and the second slot of the locking plate, wherein the fastener aids in guiding the actuation of the actuator plate along the first axis of travel, wherein the fastener aids in guiding the actuation of the locking plate along the second axis of travel, and wherein the first axis of travel and the second axis of travel are angularly offset from one another.

15. The work surface having a lock assembly of claim 14, wherein the first axis of travel and the second axis of travel are coplanar with one another.

16. The work surface having a lock assembly of claim 14, wherein the work surface is coupled to a slide-plate assembly.

17. The work surface having a lock assembly of claim 16, wherein the slide-plate assembly is coupled to an underside of the work surface.

18. The work surface having a lock assembly of claim 16, wherein the slide-plate assembly is positioned between the work surface and a bin assembly.

19. The work surface having a lock assembly of claim 18, wherein the slide-plate assembly is slidably coupled to the bin assembly.

20. The work surface having a lock assembly of claim 19, wherein the coupling between the work surface and the slide-plate assembly enables a slidable coupling of the work surface to the bin assembly.

\* \* \* \* \*